(12) United States Patent
McPheron

(10) Patent No.: US 12,104,676 B2
(45) Date of Patent: Oct. 1, 2024

(54) ARBORIST DEVICE

(71) Applicant: Michael McPheron, Sharon, PA (US)

(72) Inventor: Michael McPheron, Sharon, PA (US)

(73) Assignee: Aboreal Equipment LLC, Hermitage, PA (US)

(*) Notice: Subject to any disclaimer, the term of this patent is extended or adjusted under 35 U.S.C. 154(b) by 0 days.

(21) Appl. No.: 18/316,021

(22) Filed: May 11, 2023

(65) Prior Publication Data

US 2023/0366448 A1  Nov. 16, 2023

Related U.S. Application Data

(60) Provisional application No. 63/364,506, filed on May 11, 2022.

(51) Int. Cl.
*F16G 11/14* (2006.01)

(52) U.S. Cl.
CPC .................................. *F16G 11/14* (2013.01)

(58) Field of Classification Search
CPC ....... F16G 11/14; F16G 11/146; F16G 11/046
See application file for complete search history.

(56) References Cited

U.S. PATENT DOCUMENTS

| | | | | |
|---|---|---|---|---|
| 2,595,806 | A * | 5/1952 | Morris | F16G 11/00 24/129 R |
| 10,422,411 | B2 * | 9/2019 | VerBrugge | F16G 11/046 |
| 10,925,353 | B1 * | 2/2021 | Fayena | A44B 19/262 |
| 2002/0035766 | A1 * | 3/2002 | Szabo | F16G 11/14 24/265 R |
| 2009/0320248 | A1 * | 12/2009 | Naquin | F16G 11/02 24/129 R |
| 2014/0123438 | A1 * | 5/2014 | Donovan | B65H 75/36 24/115 N |
| 2019/0346018 | A1 * | 11/2019 | Portolés Griñán | E04H 17/261 |
| 2020/0093244 | A1 * | 3/2020 | Meillan | A45F 3/26 |
| 2020/0271193 | A1 * | 8/2020 | Benavidez | F16G 11/046 |
| 2023/0054395 | A1 * | 2/2023 | Cowell | A62B 35/0037 |

* cited by examiner

*Primary Examiner* — David M Upchurch
(74) *Attorney, Agent, or Firm* — Nolan IP Law; Jason M. Nolan

(57) ABSTRACT

An arborist device and method of using the same are provided. The device can include a unitary structure having a head and a body that together define an internal open space; the structure extending longitudinally from a first end on the head to a second end opposite the first end, the second end defining an annular opening that provides access to the internal open space; and an annular groove defined by a depression on an external surface of the unitary structure, wherein the groove demarcates the head from the body; and wherein the head includes an opening at the first end, the opening extending into a channel that extends toward the groove, on a front side of the unitary structure.

19 Claims, 15 Drawing Sheets

ARBORIST DEVICE

CROSS-REFERENCE TO RELATED APPLICATIONS

This application claims the benefit of priority under 35 U.S.C. § 119(e) of U.S. Provisional Application Ser. No. 63/364,506 filed on May 11, 2022, the content of which is relied upon and incorporated herein by reference in its entirety.

FIELD

The present disclosure generally relates to arboriculture; and more particularly, to an arborist device that can be attached to a throwing line, a throwing weight, and a working rope.

BACKGROUND

In arboriculture, it is sometimes necessary to have ropes running through the crotches, V-shaped junctions, and/or U-shaped junctions located between tree limbs or between a limb and the trunk of a tree. Installing and positioning these ropes can be accomplished using a throwing weight and a throwing line. The throwing weight can be a fabric bag containing shot and a metal ring attached thereto. The throwing line can be a lightweight, thin-gauge rope, which can be used to pull a working rope upward. The throwing weight can be tied to the throwing line, and, during use, the throwing weight is launched into a tree canopy. After the launch, additional positioning may be required to isolate the throwing line over one or more tree crotches. Sometimes the throwing weight or the throwing line can get snagged in the tree canopy. For example, the metal ring on the throwing weight can get hung up on a small branch; or the fabric bag may need extra force to pivot around an obstruction or through a crotch, which can result in the throw weight becoming stuck in the tree canopy. As a result, the throwing line and/or throwing weight may be damaged or abandoned in the tree. For at least these reasons, there is a need for a device and method that can improve the techniques used by arborists.

SUMMARY

In various embodiments, an arborist device is provided. The arborist device can comprise: a unitary structure having a head and a body that together define an internal open space; the structure extending longitudinally from a first end on the head to a second end opposite the first end, the second end defining an annular opening that provides access to the internal open space; and an annular groove defined by a depression on an external surface of the unitary structure, wherein the groove demarcates the head from the body; wherein the head comprises an opening at the first end, the opening extending into a channel that extends toward the groove, on a front side of the unitary structure.

In some embodiments, the channel comprises a first portion that flows longitudinally from the opening on the first end and a second portion that flows at an angle relative to a longitudinal axis, toward a first lateral side of the unitary structure.

In some embodiments, the channel extending toward the annular groove on a front side of the unitary structure ends at a catch.

In some embodiments, the catch is positioned within the annular groove.

In some embodiments, the catch is positioned at a spaced distance from the groove.

In some embodiments, the annular groove is configured to receive a throwing line in the depression as the throwing line is wrapped around the unitary structure.

In some embodiments, the annular groove is positioned closer to the first end than the second end.

In some embodiments, the arborist device further comprises a first knob and a second knob on an internal surface of the body, wherein the first and second knobs are positioned opposite from one another on the front side of the unitary structure and a rear side of the unitary structure.

In some embodiments, the configuration of the opening, channel, and catch facilitate a manipulation or tightening of a throwing line.

In some embodiments, the opening, channel, and catch are configured for removably coupling a throwing line, a throwing weight, or a working rope.

In some embodiments, the unitary structure has a conical shape.

In some embodiments, the internal open space is configured to receive a throwing weight.

In some embodiments, the internal open space is configured to receive a working rope, the working rope being folded onto itself.

In some embodiments, the channel is configured to receive a throwing line.

In various embodiments, a method of connecting an arborist device to a throwing weight, the method comprising: providing the arborist device, comprising: a unitary structure having a head and a body that together define an internal open space; the structure extending longitudinally from a first end on the head to a second end opposite the first end, the second end defining an annular opening that provides access to the internal open space; and an annular groove defined by a depression on an external surface of the unitary structure, wherein the groove demarcates the head from the body; wherein the head comprises an opening at the first end, the opening extending into a channel that extends toward the groove, on a front side of the unitary structure; folding the throwing line over itself to create a loop and inserting the loop of the throwing line through the opening of the first end of the arborist device; placing the loop around a metal ring attached to the throwing weight, and folding the metal ring over the loop; and pulling the throwing line away from the first end to cause the throwing weight to be inserted into the internal open space of the arborist device.

In some embodiments, the channel comprises a first portion that flows longitudinally from the opening on the first end and a second portion that flows at an angle relative to a longitudinal axis, toward a first lateral side of the unitary structure.

In some embodiments, the channel extending toward the annular groove on a front side of the unitary structure ends at a catch, the catch being positioned within the annular groove or at a spaced distance from the groove.

In various embodiments, a method of connecting an arborist device to a working rope, the method comprising: providing the arborist device, comprising: a unitary structure having a head and a body that together define an internal open space; the structure extending longitudinally from a first end on the head to a second end opposite the first end, the second end defining an annular opening that provides access to the internal open space; and an annular groove defined by a depression on an external surface of the unitary structure, wherein the groove demarcates the head from the body; wherein the head comprises an opening at the first end, the opening extending into a channel that extends toward the groove, on a front side of the unitary structure; folding the throwing line over itself to create a loop and inserting the loop of the throwing line through the opening of the first end of the arborist device; threading the working rope through the loop of the throwing line; pulling the throwing line away from the first end, causing the working rope to be inserted into the internal open space of the arborist device.

In some embodiments, the channel comprises a first portion that flows longitudinally from the opening on the first end and a second portion that flows at an angle relative to a longitudinal axis, toward a first lateral side of the unitary structure.

In some embodiments, the channel extending toward the annular groove on a front side of the unitary structure ends at a catch, the catch being positioned within the annular groove or at a spaced distance from the groove.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

FIG. 7A shows the arborist device of FIG. 1A or FIG. 1B along with the throwing line and the throwing weight prior to use;

FIG. 7GG illustrates an alternative step of the throwing line being tied to the arborist device of FIG. 1A or FIG. 1B;

FIG. 7HH illustrates an alternative step of the throwing line being tied to the arborist device of FIG. 1A or FIG. 1B;

FIG. 7P shows the throwing line disengaged from the arborist device of FIG. 1A or FIG. 1B.

Figure 1A:
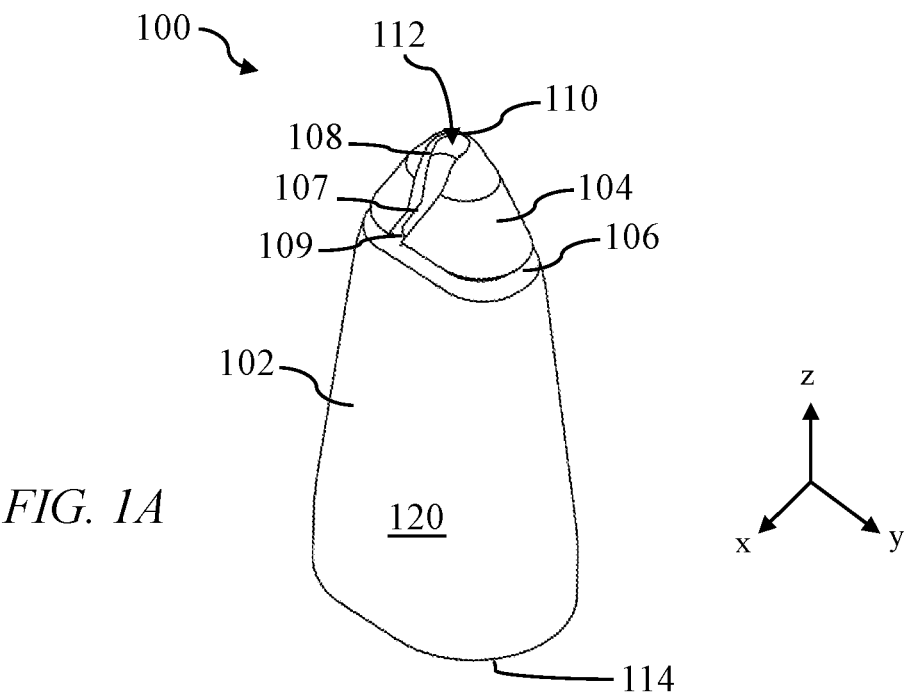
FIG. 1A is a perspective view of an arborist device, in accordance with some embodiments described herein.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference characters will be used throughout the drawings to refer to the same or like parts.

Before describing the exemplary embodiments, it is noted the embodiments reside primarily in combinations of components and procedures related to the device. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the various embodiments described herein are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

In various embodiments, an arborist device is provided. The arborist device described herein is configured to be removably connected to a throwing line, a throwing weight, and/or a working rope and to be used in arboriculture.

In some embodiments, as shown in FIGS. 1A, 2A, 3A, 4A, and 5-7P, the arborist device 100 is provided. In some embodiments, the arborist device 100 comprises a unitary structure that includes the body 102 and the head 104. In some embodiments, the arborist device 100 comprises a generally hollow structure, whereby the body 102 and head 104 define an internal open space 112. In some embodiments, the arborist device 100 comprises a generally conical shape extending longitudinally (the z-axis) from the first end 110, which is proximate to the head 104, to the second end 114. In some embodiments, the second end 114 defines an annular and/or elliptical opening that provides access to the internal open space 112.

In some embodiments, the arborist device 100 comprises the groove 106. In such embodiments, the groove 106 is defined by an annular depression on the external surface 120 of the arborist device 100. The groove 106 can be any suitable size (width and depth). In such embodiments, the suitability is based on the gauge of the throwing line employed by the user. In some embodiments, as shown in the figures, the groove 106 is positioned closer to the first end 110 than the second end 114. In some embodiments, the groove 106 demarcates the body 102 from the head 104 in the unitary structure.

Figure 2A:
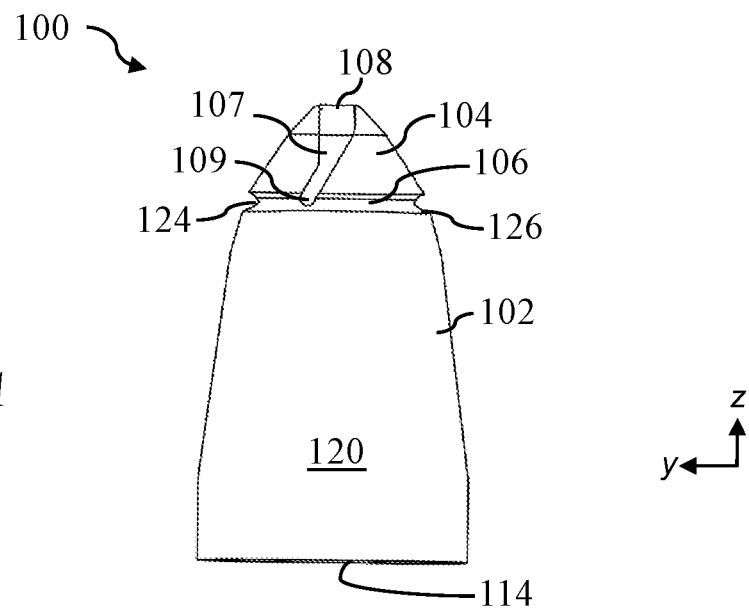
FIG. 2A is a front view of the arborist device of FIG. 1A.
Figure 3A:
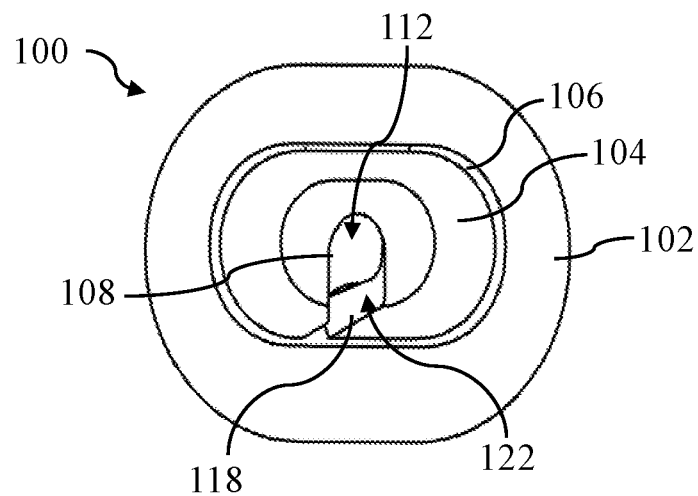
FIG. 3A is a top view of the arborist device of FIG. 1A.

In some embodiments, as shown in FIGS. 1A, 2A, and 3A, the first end 110 comprises the opening 108. In some embodiments, the opening 108 comprises a semi-circular or U-shaped cross-sectional shape as viewed from above (see top view in FIG. 3A). In such embodiments, the incomplete portion of the opening 108 (i.e., the portion between the corresponding edges of the semi-circular or U-shape) extends into the channel 107, which is a gap extending through the head 104, generally in the longitudinal direction toward the groove 106 and/or second end 114. In some embodiments, the channel 107 has a tapered shape and the space between the edges of the channel narrow as the channel 107 progresses further from the opening 108 toward the groove 106 and/or second end 114. In some embodiments, a portion of the channel 107 extends through the head 104 at an angle. For example, as shown in FIG. 2A, the channel 107 flows downward from the opening 108 and then angles toward the first lateral side 124 of the arborist device 100 and away from the second lateral side 126. In some embodiments, the channel 107 extends toward and ends at the catch 109. In some embodiments, as shown in FIG. 2A, for example, the catch 109 is positioned within the groove 106.

FIGS. 3A, 4A, 5, and 6 show the internal open space 112 defined by the shape and configuration of the body 102 and head 104. The top view in FIG. 3A shows the semi-circular or U-shape of the opening 108. In some embodiments, the opening 108 and the channel 107 extending therefrom are carved out of the head 104 in a manner that creates a wedge 118 along the internal surface 122. During use, the configuration of the opening 108, the channel 107, the catch 109, and the wedge 118 allow the user to manipulate and/or tighten a throwing line.

In some embodiments, during use, the orientation and configuration of the catch 109 can facilitate the wrapping of a throwing line around the groove 106. For example, as shown in FIG. 7F, a portion of the throwing line L can be pulled out of the opening 108 and/or channel 107 and wedged into the catch 109 before wrapping the throwing line L around the groove 106. In some embodiments, the orientation and configuration of the wedge 118 can facilitate/guide the direction in which the throwing line L is wrapped around the groove 106.

Figure 4A:
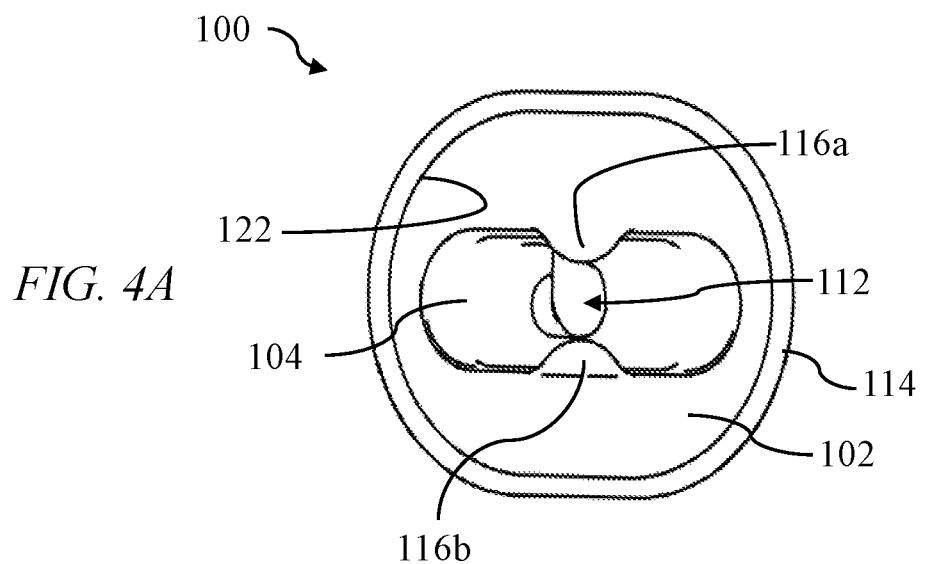
FIG. 4A is a bottom view of the arborist device of FIG. 1A.
Figure 4B:
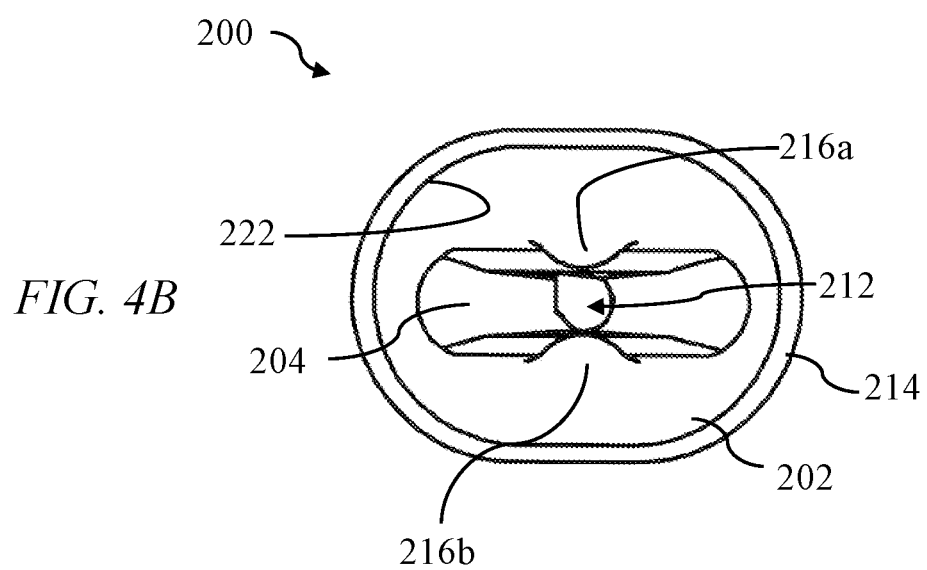
FIG. 4B is a bottom view of the arborist device of FIG. 1B.

In some embodiments, as shown in the bottom view in FIG. 4A, the arborist device 100 comprises the knobs 116a and 116b. In such embodiments, the knobs 116a, 116b project inward from the interior surface 122. In some embodiments, the interior surface 122 is configured such that the knobs 116a, 116b project inward from the body 102 toward the center of the internal open space 112.

Figure 5:
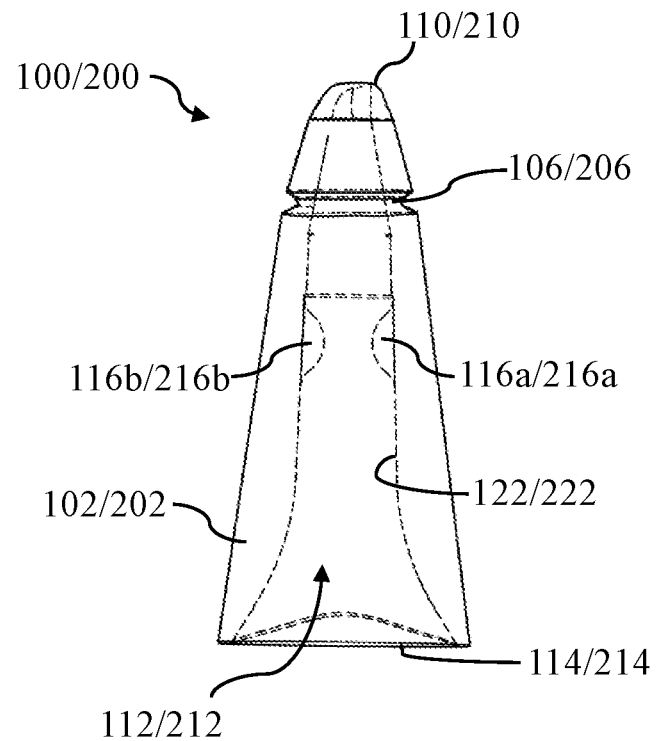
FIG. 5 is a side view of the arborist device of FIG. 1A or FIG. 1B, showing the internal configuration in broken lines.
Figure 6:
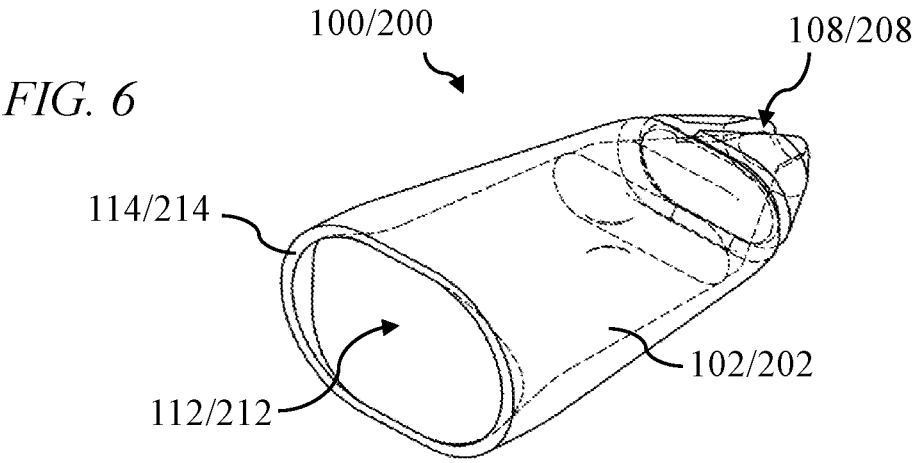
FIG. 6 is a bottom perspective side view of the arborist device in FIG. 1A or FIG. 1B, showing the internal configuration in broken lines.

In some embodiments, for example, as shown in FIG. 5, the knobs 116a, 116b are positioned closer to the groove 106 than to the second end 114. In such embodiments, the knobs 116a, 116b are oriented on opposing sides of the interior surface 122 and project toward one another.

In some embodiments, during use, the orientation and configuration of the knobs 116a, 116b can allow or disallow items from being inserted into or removed from the portion of the internal open space 112 defined by the head 104. For example, as shown in FIG. 7D, the throwing weight W can be connected to the throwing line L, which is provided to the internal open space 112 through the opening 108, and the connected throwing weight W and throwing line L can be pulled through the second end 114 toward the first end 110. In some embodiments, because the knobs 116a, 116b are oriented on opposing sides of the interior surface 122 and project toward one another, the throwing weight W and throwing line L may be allowed to or prevented from being inserted into or removed from the portion of the internal open space 112 defined by the head 104.

In some embodiments, as shown in FIGS. 1B, 2B, 3B, 4B, and 5-7P, the arborist device 200 is provided. In some embodiments, the arborist device 200 comprises the body 202 and the head 204. In some embodiments, the arborist device 200 comprises a generally hollow structure, whereby the body 202 and head 204 define an internal open space 212. In some embodiments, the arborist device 200 comprises a generally conical shape extending longitudinally (the z-axis) from the first end 210, which is proximate to the head 204, to the second end 214. In some embodiments, the second end 214 defines an annular and/or elliptical opening that provides access to the internal open space 212.

In some embodiments, the arborist device 200 comprises the groove 206. In such embodiments, the groove 206 is defined by an annular depression on the external surface 220 of the arborist device 200. The groove 206 can be any suitable size (width and depth). In such embodiments, the suitability is based on the gauge of the throwing line employed by the user. In some embodiments, as shown in the figures, the groove 206 is positioned closer to the first end 210 than the second end 214. In some embodiments, the groove 206 demarcates the body 202 from the head 204 in the unitary structure.

Figure 1B:
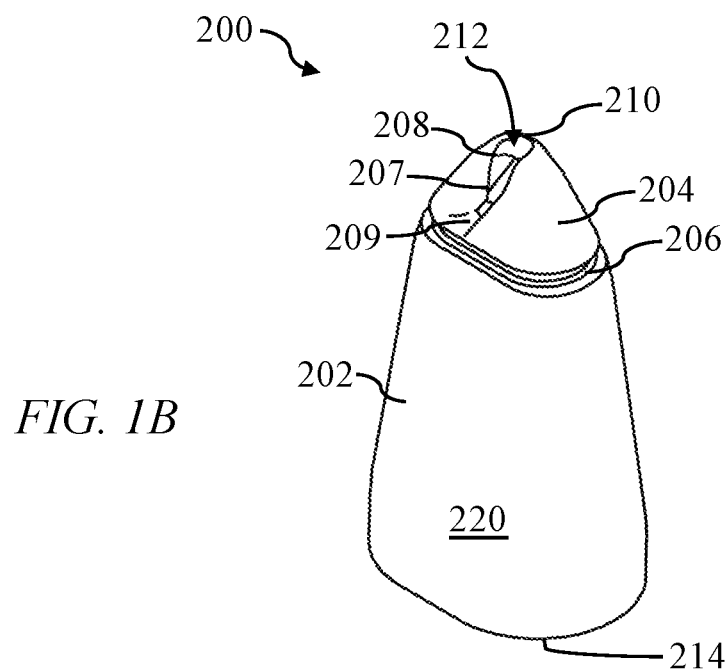
FIG. 1B is a perspective view of an arborist device, in accordance with some embodiments described herein.
Figure 2B:
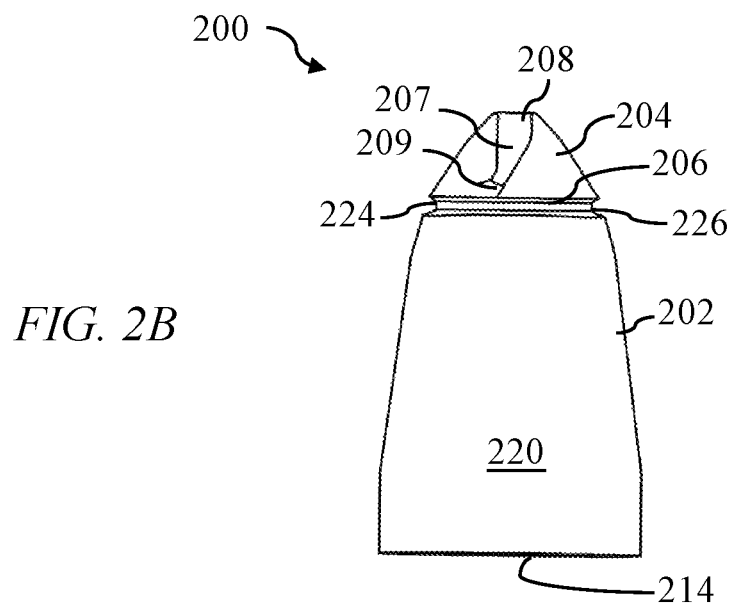
FIG. 2B is a front view of an arborist device of FIG. 1B.
Figure 3B:
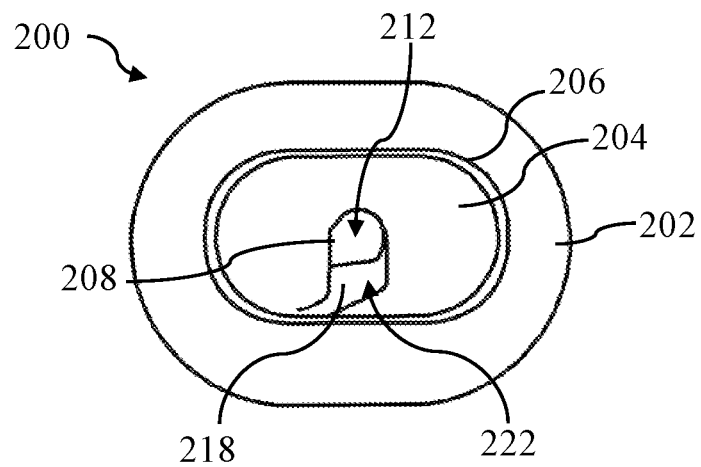
FIG. 3B is a top view of the arborist device of FIG. 1B.

In some embodiments, as shown in FIGS. 1B, 2B, and 3B, the first end 210 comprises the opening 208. In some embodiments, the opening 208 comprises a semi-circular or U-shaped cross-sectional shape as viewed from above (see top view in FIG. 3B). In such embodiments, the incomplete portion of the opening 208 (i.e., the portion between the corresponding edges of the semi-circular or U-shape) extends into the channel 207, which extends through the head 204, generally in the longitudinal direction toward but the groove 206 and/or second end 214. As shown in the figures, the channel 207 extends toward but not extend to or into the groove 206. Rather, the channel 207 stops at a position in the head 204 above (z-axis) the groove 206. In some embodiments, the channel 207 has a tapered shape and the space between the edges of the channel narrow as the channel 207 progresses further from the opening 208 toward the groove 206 and/or second end 214. In some embodiments, a portion of the channel 207 extends through the head 204 at an angle. For example, as shown in FIG. 2B, the channel 207 flows downward from the opening 208 and then angles toward the first lateral side 224 of the arborist device 200 and away from the second lateral side 226. In some embodiments, the channel 207 extends toward and ends at the catch 209. In some embodiments, as shown in FIG. 2B, for example, the catch 209 is in the head 204 at a position above (z-axis) the groove 206.

FIGS. 3B, 4B, 5, and 6 show the internal open space 212 defined by the shape and configuration of the body 202 and head 204. The top view in FIG. 3B shows the semi-circular or U-shape of the opening 208. In some embodiments, the opening 208 and the channel 207 extending therefrom are carved out of the head 204 in a manner that creates a wedge 218 along the internal surface 222. During use, the configuration of the opening 208, the channel 207, the catch 209, and the wedge 218 allow a user to manipulate and/or tighten a throwing line.

In some embodiments, during use, the orientation and configuration of the catch 209 can facilitate the wrapping of a throwing line around the groove 206. For example, as shown in FIG. 7F, a portion of the throwing line L can be pulled out of the opening 208 and/or channel 207 and wedged into the catch 209 before wrapping the throwing line L around the groove 206. In some embodiments, the orientation and configuration of the wedge 218 can facilitate the direction in which the throwing line L is wrapped around the groove 106.

In some embodiments, as shown in the bottom view in FIG. 4A, the arborist device 200 comprises the knobs 216a and 216b. In such embodiments, the knobs 216a, 216b project inward from the interior surface 222. In some embodiments, the interior surface 222 is configured such that the knobs 216a, 216b project inward from the body 202 toward the center of the internal open space 212.

In some embodiments, for example, as shown in FIG. 5, the knobs 216a, 116b are positioned closer to the groove 206 than to the second end 214. In such embodiments, the knobs 216a, 216b are oriented on opposing sides of the interior surface 222 and project toward one another.

In some embodiments, during use, the orientation and configuration of the knobs 216a, 216b can allow or disallow items from being inserted into or removed from the portion of the internal open space 212 defined by the head 204. For example, as shown in FIG. 7D, the throwing weight W can be connected to the throwing line L, which is provided to the internal open space 212 through the opening 208, and the connected throwing weight W and throwing line L can be pulled through the second end 214 toward the first end 210. In some embodiments, because the knobs 216a, 216b are oriented on opposing sides of the interior surface 222 and project toward one another, the throwing weight W and throwing line L may be allowed to or prevented from being inserted into or removed from the portion of the internal open space 212 defined by the head 204.

Figure 2C:
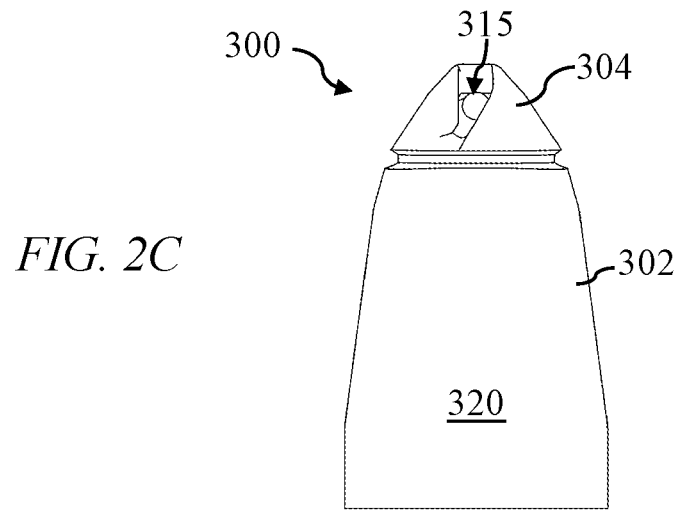
FIG. 2C is a front view of an arborist device, in accordance with some embodiments described herein.
Figure 2D:
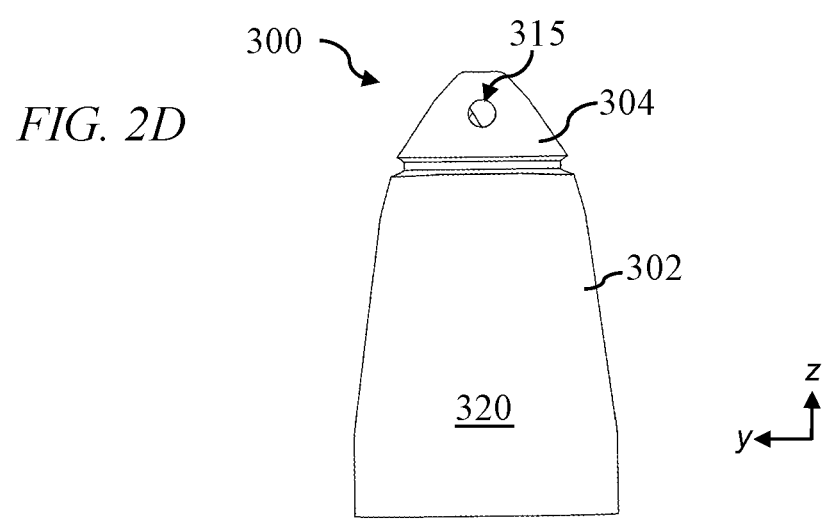
FIG. 2D is a rear view of the arborist device of FIG. 2C.

In some embodiments, the arborist device comprises a through-hole in the head, the through-hole being configured to receive a throwing line or a bite thereof. For example, as shown in FIG. 2C and FIG. 2D, the arborist device 300 comprises the body 302 and the head 304. The arborist device 300 comprises the external surface 320 and an internal open space defined by the body 302 and the head 304. In some embodiments, the arborist device 300 comprises the through-hole 315 on rear side of the head 304. In some embodiments, as shown in the figures, the through-hole 315 is generally positioned in a central portion of the head 304, with respect to they-axis and z-axis, as shown in FIG. 2D. The through-hole 315 can be any suitable size and shape. In some embodiments, the through-hole 315 is sized and shaped to receive a throwing line L. During use, the throwing line L, or a bite thereof, can be fed through the through-hole 315 from the interior open space of the arborist device 300 to the exterior of the arborist device 300, or vice versa, to assist the user when throwing a throwing weight W that has been inserted and secured inside of the arborist device 300. For example, the user could hold a bite of the throwing line L that has been fed through the through-hole 315 (from the interior to the exterior) in one hand and hold the remainder of the throwing line L in the other hand as the user throws the throwing weight W and arborist device 300 into the tree canopy.

In various embodiments, the arborist device described herein comprises external and internal configurations that allow existing throwing weights to fit within the interior open space, including, for example, when the metal ring attached to the throwing weight is folded over. In such embodiments, the shape and configuration of the interior surface of the arborist device allows for the metal ring of the throwing weight to be pulled into the area enclosed by the head and securely held in place. In various embodiments, the arborist device described herein comprises external and internal configurations such that the combined shape of the arborist device, the throwing weight, and the throwing line are more aerodynamic than the combination of the throwing weight and the throwing line are without the arborist device. In various embodiments, the shape and configuration of the interior surface of the arborist device allows for a bite of working rope (the rope folded onto itself) to fit within the interior open space and securely held therein with the throwing line.

In various embodiments, the arborist device described herein is configured to be removably connected to a throwing line, a throwing weight, and/or a working rope. In some embodiments, the arborist device is configured to enclose at least a portion of a throwing weight. As would be appreciated by those skilled in the art, a covered or partially covered throwing weight will be more aerodynamic than the throwing weight would be without the arborist device, and this improved property allows the throwing weight to pass through the air and tree canopy with less resistance. In some embodiments, a throwing weight covered or partially covered by the arborist device, which conceals the ring attached to the throwing weight, will assist in the reduction or prevention of snags between the ring and the branches of a tree. In some embodiments, a throwing weight that is covered or partially covered by the arborist device is more rigid than the throwing weight by itself. The enhanced rigidity provided by the arborist device can help prevent, or reduce the extent to which, the throwing weight is deformed or contorted (e.g., bending, flopping over) during use within a tree canopy (e.g., when the throwing weight passes over or around tree branches, crotches, etc.). In some embodiments, the external surface 120 of the arborist device 100 has a lower coefficient of friction than the surface of a throwing weight. In such embodiments, the lower coefficient of friction reduces the force necessary to move or slide the throwing weight past, around, or over obstacles in the tree canopy.

The arborist device described herein can be comprised of any suitable material. In some embodiments, for example, the arborist device is comprised of one or more plastic compositions (e.g., thermoplastics, including polyurethane). In some embodiments, for example, the arborist device is comprised of one or more milled or cast metal or metal alloys. In some embodiments, the arborist device is comprised of a single, unitary piece of material. In other embodiments, the arborist device is comprised of a plurality of pieces that are assembled to form a unitary device.

The arborist device described herein can be any suitable size. In this context, the suitability of the size depends on the size of the throwing weights used in arboriculture. In some embodiments, the device has a height about the longitudinal z-axis in the range of about 1.5 to about 3.5 inches, including, for example, heights of about 1.75, 2.00, 2.25, 2.50, 2.75, 3.00, 3.25 inches, etc. In some embodiments, the head has a height in the range of about 0.25 to about 1.50 inches, including, for example, heights of about 0.35, 0.40, 0.50, 0.75, 1.00, 1.25 inches, etc. In some embodiments, the body has a height in the range of about 1.5 to about 3.0 inches, including heights of about 1.75, 2.00, 2.10, 2.20, 2.25, 2.30, 2.50, 2.75 inches, etc. In some embodiments, the groove has a height in the range of about 0.05 to about 0.25 inches, including, for example, about 0.0625, 0.115, 0.125, 0.1875, 0.20 inches, etc. In some embodiments, the head and body have a height are defined by a ratio in the range of about 3 to 5, including, for example, a ratio of 3.50, 3.75, 4.00, 4.25, 4.50, 4.75, etc. (head:body). In some embodiments, for example, the body has a height of 2.125 inches and the head has a height of about 0.50 inches, whereby the body has a height that is 4.25 times greater than the height of the head.

In some embodiments, the device has a width about the lateral x-axis or y-axis in the range of about 0.50 to about 2.5 inches, including, for example, widths of about 0.75, 1.00, 1.125, 1.1875, 1.375, 1.4375, 1.50, 1.5625, 1.625, 1.6875, 1.75, 2.00 inches, etc. In some embodiments, the width about the x-axis and the y-axis are defined by a ratio in the range of about 0.75 to about 2.0, including, for example, 0.9, 1.0, 1.1, 1.2, 1.3, 1.4, 1.5, 1.6, 1.7, 1.8, 1.9, etc. In some embodiments, for example, the device has a width about the x-axis of about 1.25 inches, a width about the y-axis of about 1.625, whereby the width about the y-axis is 1.3 times greater than the width about the x-axis. In some embodiments, the width about the y-axis tapers from the base at the second end (wider) to the top at the first end (narrower).

Figure 7A:
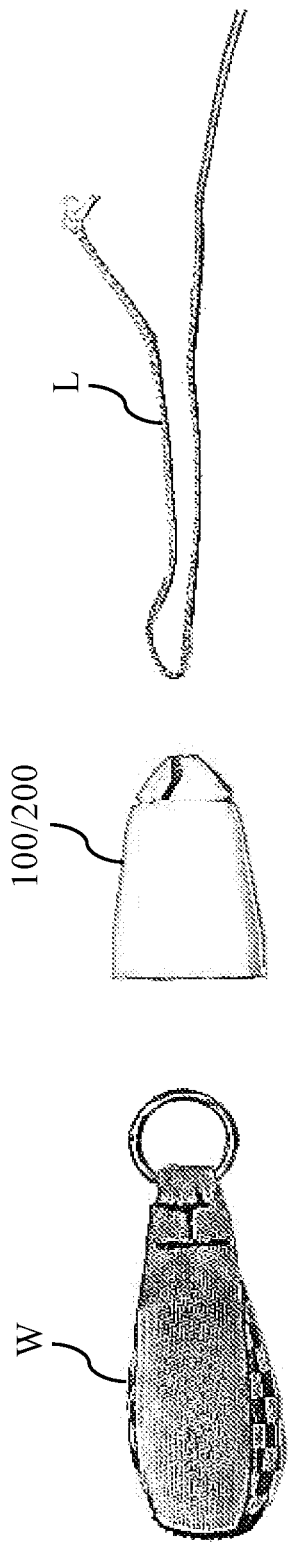
FIG. 7A-7P illustrate a method of using the arborist device in FIG. 1A or 1B.
Figure 7B:
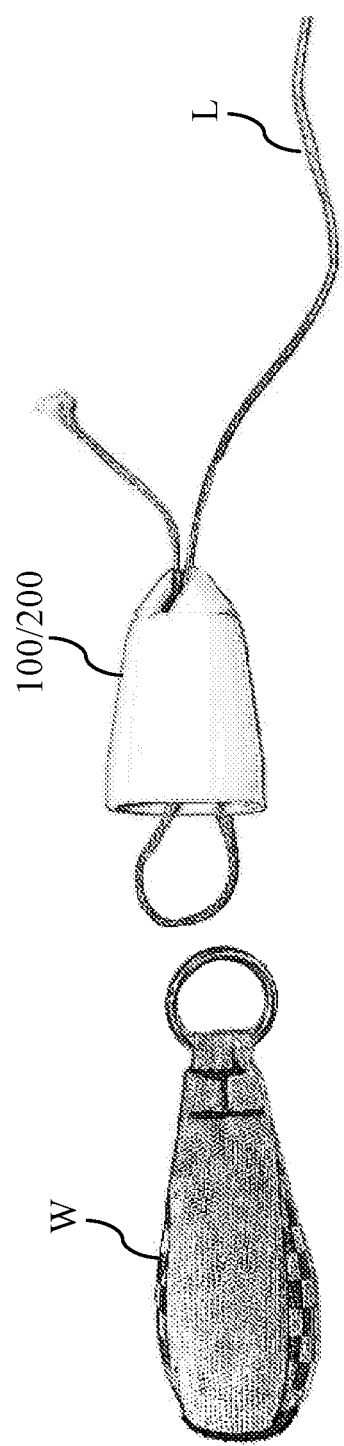
FIG. 7B illustrates the step of the throwing line being inserted into the arborist device.
Figure 7C:
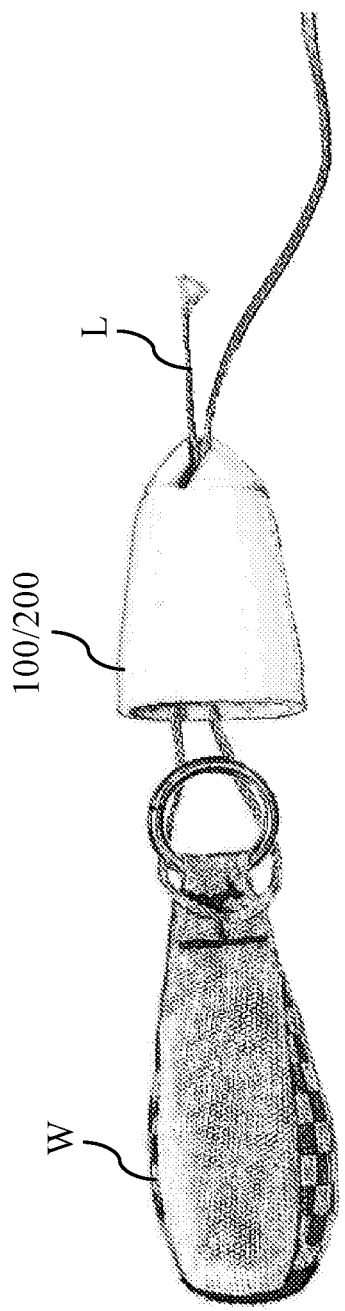
FIG. 7C illustrates the step of the throwing line inserted through the arborist device being engaged with the throwing weight.
Figure 7D:
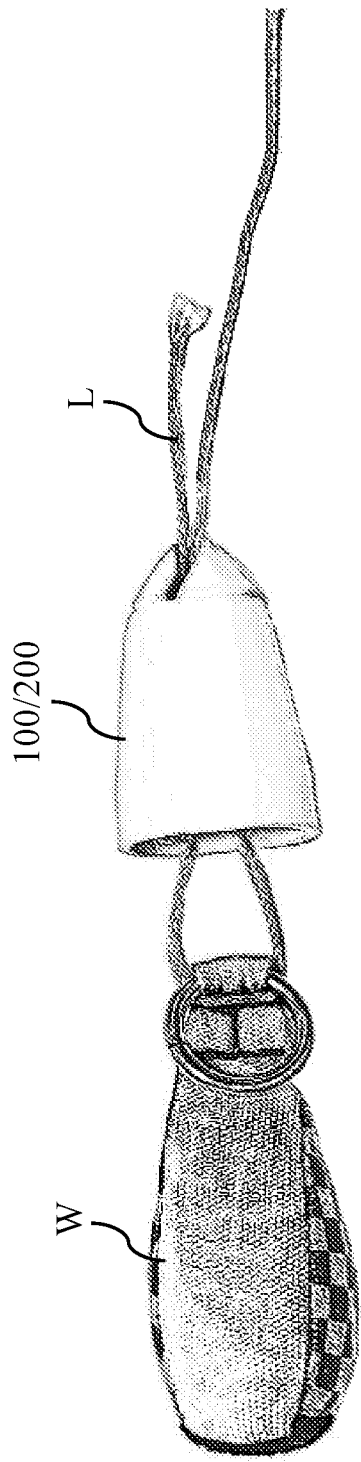
FIG. 7D illustrates the step of the metal ring of the throwing weight being engaged with the throwing line.
Figure 7E:
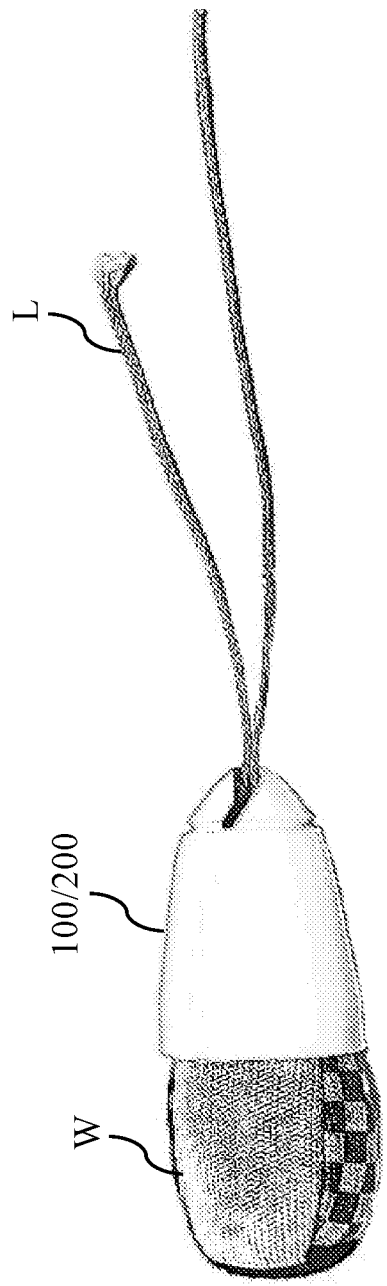
FIG. 7E illustrates the step of the throwing weight being pulled into the arborist device of FIG. 1A or FIG. 1B.
Figure 7F:
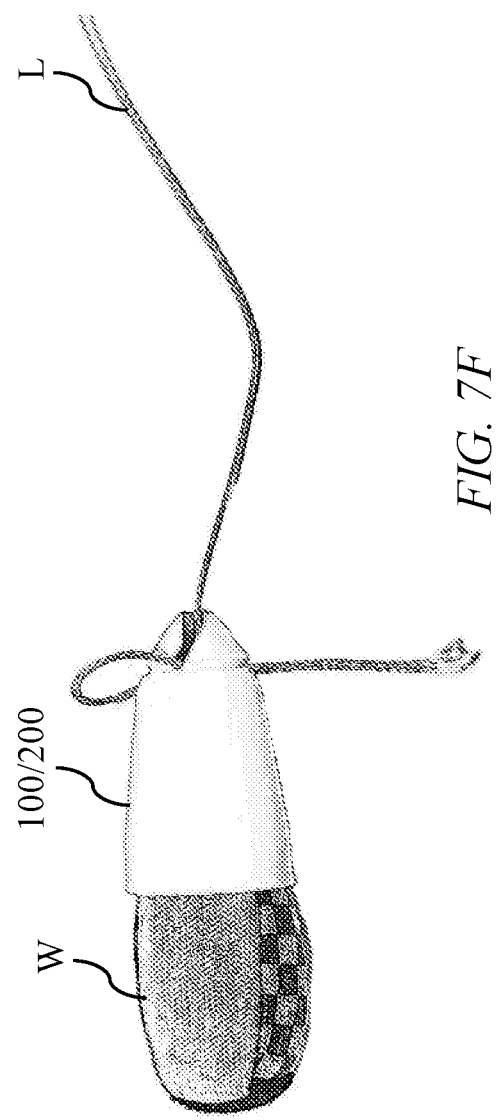
FIG. 7F illustrates the step of the throwing line being secured to the arborist device of FIG. 1A or FIG. 1B.
Figure 7G:
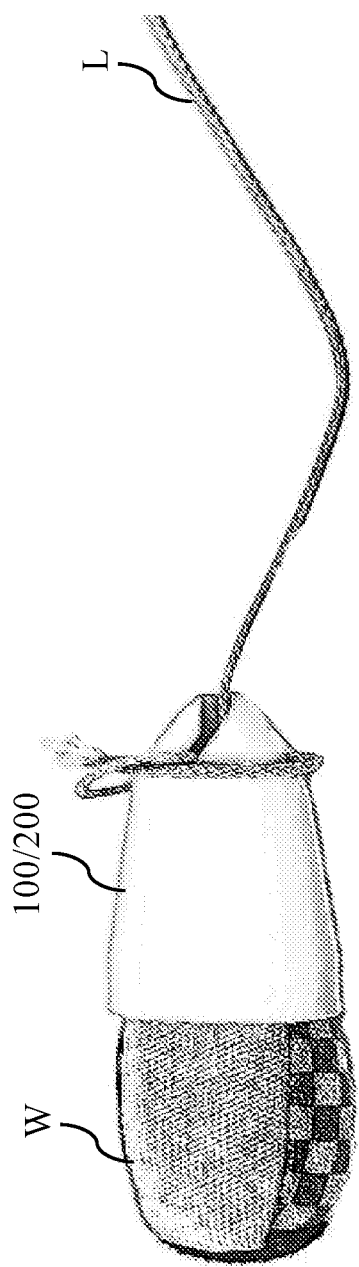
FIG. 7G illustrates the step of the throwing line being tied to the arborist device of FIG. 1A or FIG. 1B.
Figure 7H:
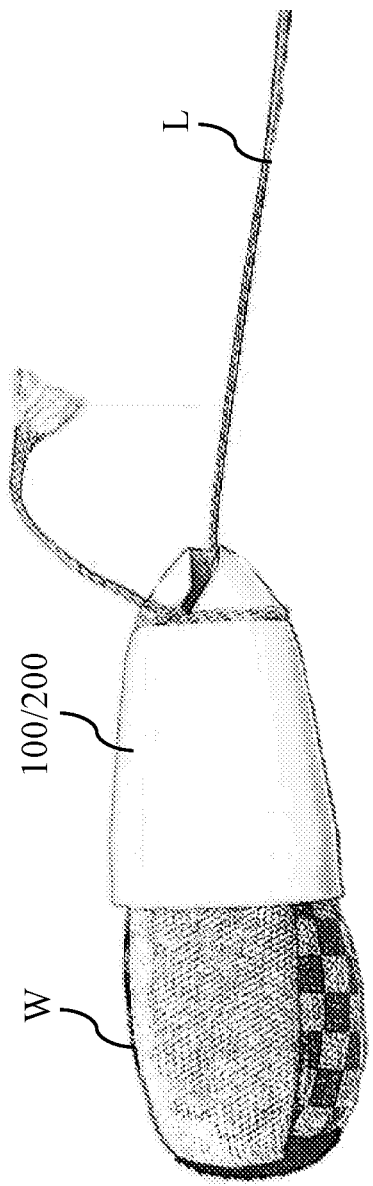
FIG. 7H illustrates the step of the throwing line being tied to the arborist device of FIG. 1A or FIG. 1B.
Figure 7G:
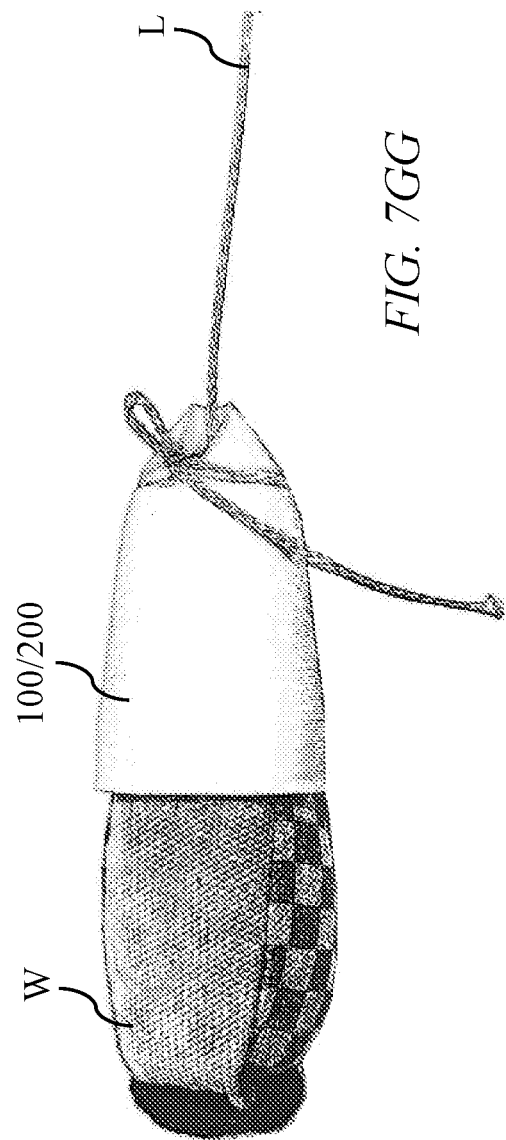
Figure 7H:
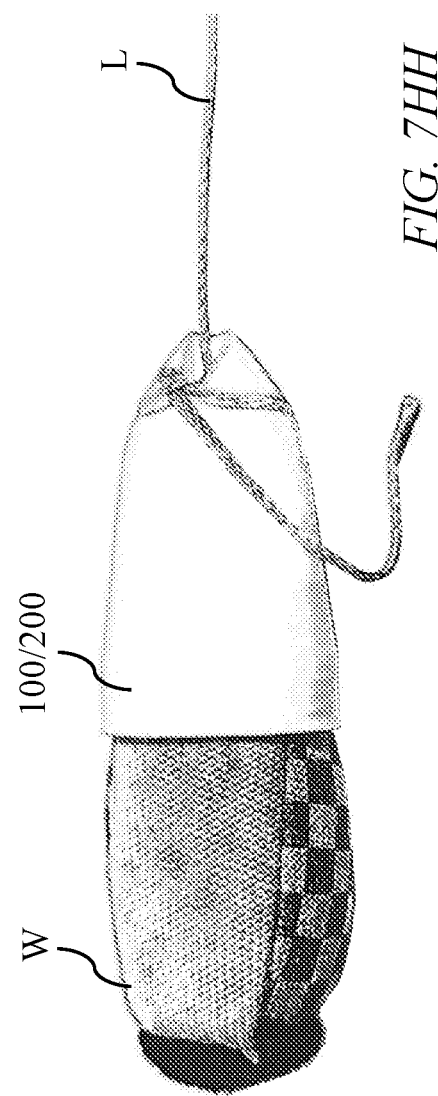
Figure 7I:
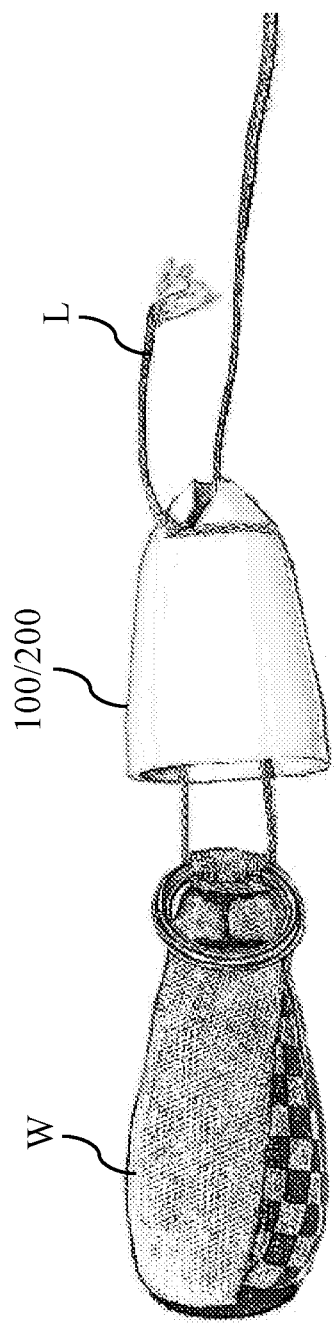
FIG. 7I illustrates the step of withdrawing the throwing weight from the arborist device of FIG. 1A or FIG. 1B.
Figure 7J:
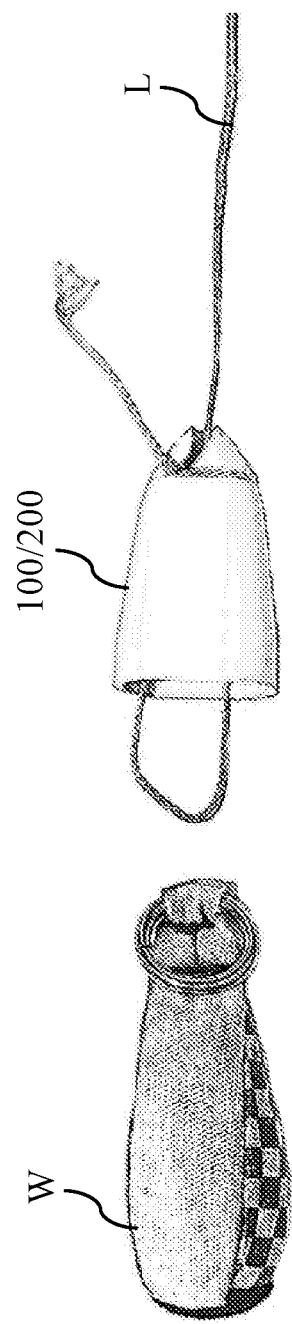
FIG. 7J illustrates the step of withdrawing the throwing weight from the throwing line.
Figure 7K:
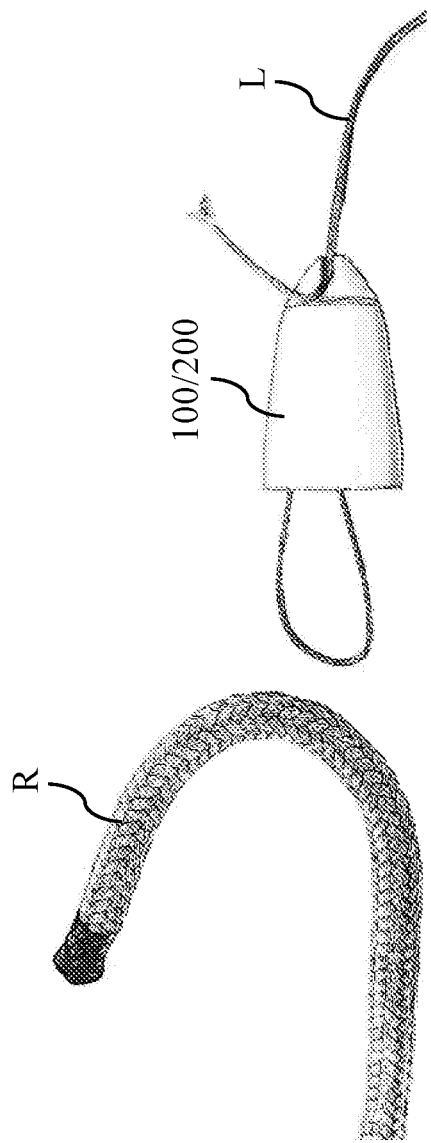
FIG. 7K shows the working rope and the throwing line tied to the arborist device of FIG. 1A or FIG. 1B.
Figure 7L:
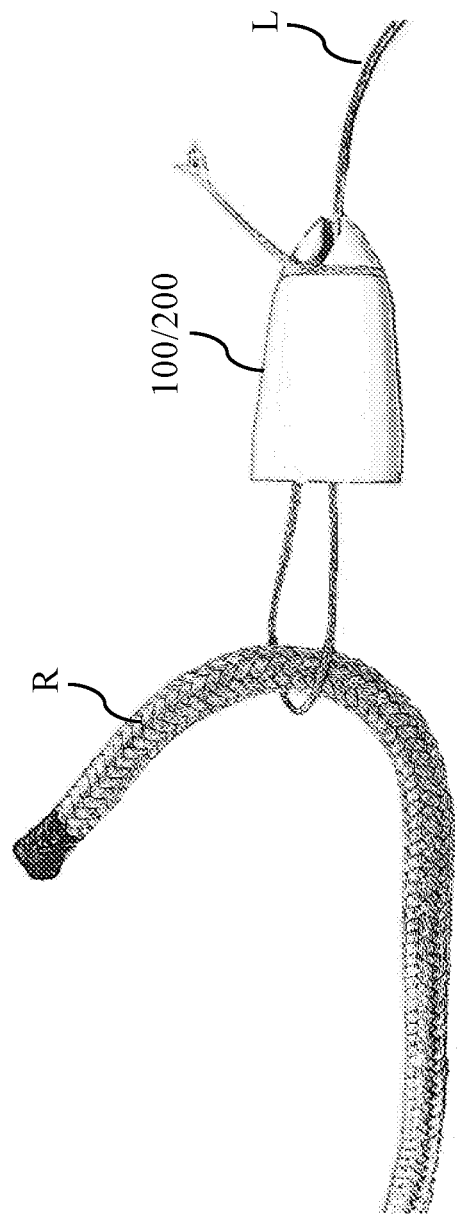
FIG. 7L illustrates the step of the working rope engaging with the throwing line tied to the arborist device of FIG. 1A or FIG. 1B.
Figure 7M:
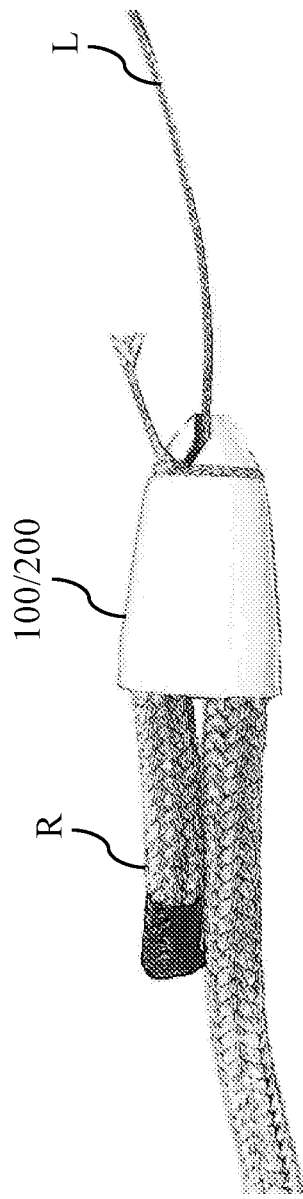
FIG. 7M illustrates the step of pulling the working rope into the arborist device of FIG. 1A or FIG. 1B.
Figure 7N:
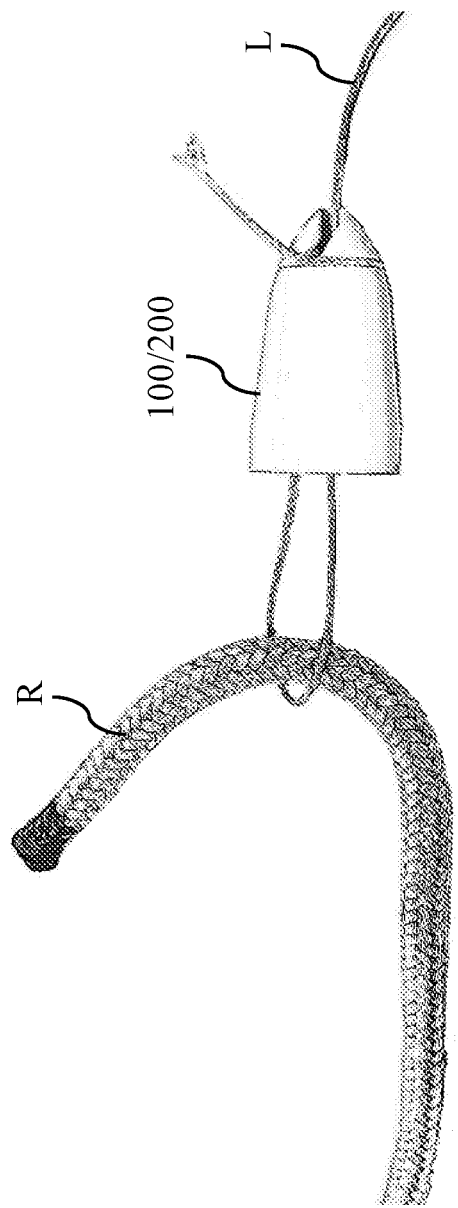
FIG. 7N illustrates the step of the working rope disengaging with the throwing line tied to the arborist device of FIG. 1A or FIG. 1B.
Figure 7O:
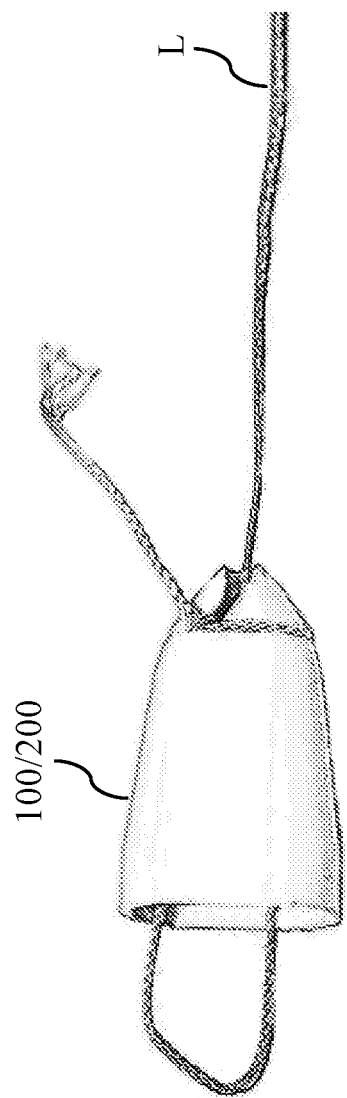
FIG. 7O shows the throwing line tied to the arborist device of FIG. 1A or FIG. 1B after the working rope or throwing weight has been disengaged from the throwing line.
Figure 7P:
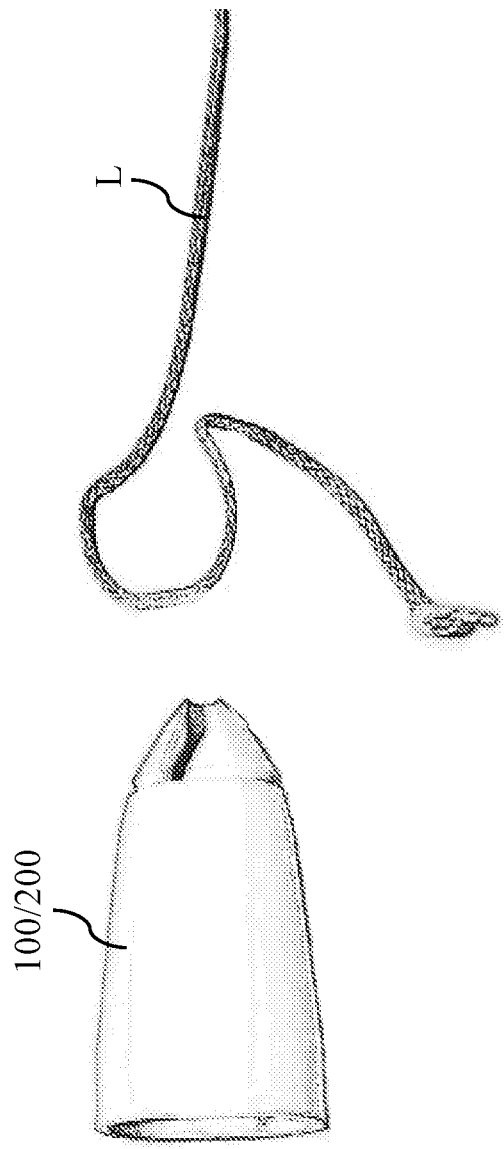

In various embodiments, as shown in FIG. 7A-7P, a method of using the arborist device 100 is provided. FIG. 7A shows the arborist device 100/200 along with the throwing line L and the throwing weight W prior to use. In such embodiments, a bite is created by folding the throwing line L over itself to create a loop. In some embodiments, for example, the bite of the throwing line creates a tail length of about 4-10 inches (e.g., 5, 6, 7 inches). As shown in FIG. 7B, the method comprises the step of inserting the bite of the throwing line L into the arborist device 100/200, whereby the inserting step includes feeding the bite through the opening 108/208 of the first end 110/210. As shown in FIG. 7C, the bite is then placed around the metal ring attached to the throwing weight W, and then the metal ring is folded over the bite, as shown in FIG. 7D. Next, the throwing line L is pulled away from the first end 110/210, which causes the throwing weight W to be inserted into the internal open space 112/212 of the arborist device 100/200, as shown in FIG. 7E.

In some embodiments, the method further comprises moving the tail portion of the throwing line L to the catch 109/209 and then wrapping the throwing line L around the groove 106/206, as shown in FIG. 7F. Next, as shown in FIG. 7G, the tail portion of the throwing line L is threaded under the loop made by the tail where it exits the catch 109/209. In FIG. 7H, the throwing line L is pulled away from the arborist device 100/200, which tightens the throwing line L around the groove 106/206 as well as itself. This step secures the throwing weight W to the arborist device 100/200, which is now assembled for the arborist to use. For example, the arborist can throw the combined throwing weight W and arborist device 100/200 into the tree canopy, including over a tree branch, and then retrieve the combined weight/device when it returns to the ground. In this example, the throwing line L is connected to the throwing weight W and arborist device 100/200 on one side of a tree branch and held by the user on the other side of the tree branch.

In some embodiments, an alternative method of tying the tail portion of the throwing line L is provided. As shown in FIG. 7GG, the tail portion of the throwing line L is folded over itself to obtain a bite and the bite is threaded through the loop made by the tail where it exits the catch 109/209, as shown in FIG. 7F. In FIG. 7HH, the throwing line L is pulled away from the arborist device 100/200, which tightens the throwing line L around the groove 106/206 as well as itself. This step secures the throwing weight W to the arborist device 100/200, which is now assembled for the arborist to use.

In some embodiments, the method further comprises removing the throwing weight W from the arborist device 100/200. In such embodiments, the throwing weight W is withdrawn from the internal open space 112/212 of the arborist device 100/200, as shown in FIG. 7I, by pulling the throwing weight W and the arborist device 100/200 in opposite directions. Once withdrawn from the internal open space 112/212, the bite of the throwing line L can be removed from the throwing weight W, as shown in FIG. 7J. Next, the working rope R is provided, as shown in FIG. 7K. In FIG. 7L, the working rope R is threaded through the bite of throwing line L. As shown in FIG. 7M, the throwing line L is pulled away from the first end 110/210, which causes the working rope R to be inserted into the internal open space 112/212 of the arborist device 100/200. After securing the working rope R to the arborist device 100/200, the user can be pull on the throwing line L such that the working rope R and arborist device 100/200 combination is pulled back up and over the tree branch, and when it returns to the ground it carries the working rope R to the user. At this point, the working rope R is up and over the tree branch with a portion of its length extending toward the ground on either side. With the working rope R secured in its desired position, the bite of the working rope R can be pulled apart from the arborist device 100/200, as shown in FIG. 7N, and then withdrawn from the throwing line L, as shown in FIG. 7O. Finally, the method comprises the step of untying the throwing line L, unwinding the throwing line L from the groove 106, and withdrawing the throwing line L from the arborist device 100, as shown in FIG. 7P.

As used herein, the term "conical" refers to a shape resembling a cone and does not require the cone to have a perfectly circular cross-sectional shape. For example, the cross-sectional shape of the conical structure can be an imperfect circle (i.e., not all points on the circle are equidistant from the center), elliptical, curved band, ring, or loop.

Reference is made herein to the term "throwing line." The term throwing line is also referred to in the art as a "throw line" or "throwline." Reference is made herein to the term "throwing weight." The term throwing weight is also referred to in the art as a "throw weight."

Exemplary embodiments of the systems and methods are described above in detail. The systems and methods are not limited to the specific embodiments described herein, but rather, components of the systems and/or steps of the method may be utilized independently and separately from other components and/or steps described herein. For example, the system may also be used in combination with other systems and methods, and is not limited to practice with only a system as described herein. Rather, the exemplary embodiment can be implemented and utilized in connection with many other systems.

Although specific features of the present embodiments may be shown in some drawings and not in others, this is for convenience only. In accordance with the principles of the disclosure, any feature of a drawing may be referenced and/or claimed in combination with any feature of any other drawing.

This written description uses examples to disclose the present embodiments, including the best mode, and also to enable any person skilled in the art to practice the present embodiments, including making and using any devices or systems and performing any incorporated methods. The patentable scope of the present embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. An arborist device, comprising:
    a unitary structure having a head and a body that together define a generally conical shape with an internal open space; the unitary structure extending longitudinally from a first end on the head to a second end opposite the first end, the second end defining an annular opening that provides access to the internal open space, wherein the first end has a first width and the second end has a second width that is wider than a first width; and
    an annular groove defined by a depression on an external surface of the unitary structure, wherein the groove demarcates the head from the body;
    wherein the head comprises an opening at the first end, the opening extending into a channel that extends toward the annular groove, on a front side of the unitary structure.

2. The arborist device according to claim 1, wherein the channel comprises a first portion that flows longitudinally from the opening on the first end and a second portion that flows at an angle relative to a longitudinal axis, toward a first lateral side of the unitary structure.

3. The arborist device according to claim 1, wherein the channel extending toward the annular groove on a front side of the unitary structure ends at a catch.

4. The arborist device according to claim 3, wherein the catch is positioned within the annular groove.

5. The arborist device according to claim 3, wherein the catch is positioned at a spaced distance from the groove.

6. The arborist device according to claim 1, wherein the annular groove is configured to receive a throwing line in the depression as the throwing line is wrapped around the unitary structure.

7. The arborist device according to claim 1, wherein the annular groove is positioned closer to the first end than the second end.

8. The arborist device according to claim 1, further comprising a first knob and a second knob on an internal surface of the body, wherein the first and second knobs are positioned opposite from one another on the front side of the unitary structure and a rear side of the unitary structure.

9. The arborist device according to claim 1, wherein the configuration of the opening, channel, and catch are configured to allow a manipulation or tightening of a throwing line.

10. The arborist device of claim 1, configured for removably coupling a throwing line, a throwing weight, or a working rope.

11. The arborist device according to claim 1, wherein the internal open space is configured to receive a throwing weight.

12. The arborist device according to claim 1, wherein the internal open space is configured to receive a working rope, the working rope being folded onto itself.

13. The arborist device according to claim 1, wherein the channel is configured to receive a throwing line.

14. A method of connecting an arborist device to a throwing weight, the method comprising:
    providing the arborist device, comprising:
        a unitary structure having a head and a body that together define a generally conical shape with an internal open space; the unitary structure extending longitudinally from a first end on the head to a second end opposite the first end, the second end defining an annular opening that provides access to the internal open space, wherein the first end has a first width and the second end has a second width that is wider than a first width; and
        an annular groove defined by a depression on an external surface of the unitary structure, wherein the groove demarcates the head from the body;
        wherein the head comprises an opening at the first end, the opening extending into a channel that extends toward the annular groove, on a front side of the unitary structure;
    folding the throwing line over itself to create a loop and inserting the loop of the throwing line through the opening of the first end of the arborist device;
    placing the loop around a metal ring attached to the throwing weight, and folding the metal ring over the loop; and
    pulling the throwing line away from the first end to cause the throwing weight to be inserted into the internal open space of the arborist device.

15. The method according to claim 14, wherein the channel comprises a first portion that flows longitudinally from the opening on the first end and a second portion that flows at an angle relative to a longitudinal axis, toward a first lateral side of the unitary structure.

16. The arborist device according to claim 14, wherein the channel extending toward the annular groove on a front side of the unitary structure ends at a catch, the catch being positioned within the annular groove or at a spaced distance from the groove.

17. A method of connecting an arborist device to a working rope, the method comprising:

providing the arborist device, comprising:

a unitary structure having a head and a body that together define a generally conical shape with an internal open space; the unitary structure extending longitudinally from a first end on the head to a second end opposite the first end, the second end defining an annular opening that provides access to the internal open space, wherein the first end has a first width and the second end has a second width that is wider than a first width; and an annular groove defined by a depression on an external surface of the unitary structure, wherein the groove demarcates the head from the body;

wherein the head comprises an opening at the first end, the opening extending into a channel that extends toward the annular groove, on a front side of the unitary structure;

folding the throwing line over itself to create a loop and inserting the loop of the throwing line through the opening of the first end of the arborist device;

threading the working rope through the loop of the throwing line;

pulling the throwing line away from the first end, causing the working rope to be inserted into the internal open space of the arborist device.

18. The method according to claim 17, wherein the channel comprises a first portion that flows longitudinally from the opening on the first end and a second portion that flows at an angle relative to a longitudinal axis, toward a first lateral side of the unitary structure.

19. The method according to claim 17, wherein the channel extending toward the annular groove on a front side of the unitary structure ends at a catch, the catch being positioned within the annular groove or at a spaced distance from the groove.

* * * * *